(12) United States Patent  
Powell

(10) Patent No.: US 9,272,654 B1  
(45) Date of Patent: Mar. 1, 2016

(54) SPRING-LOADED BUMPER CLAMP FOR VEHICULAR TRAILERS

(71) Applicant: Tiffinee Powell, Corpus Christi, TX (US)

(72) Inventor: Anthony J. Powell, Corpus Christi, TX (US)

(73) Assignee: Tiffinee Powell, Corpus Christi, TX (US)

( * ) Notice: Subject to any disclaimer, the term of this patent is extended or adjusted under 35 U.S.C. 154(b) by 173 days.

(21) Appl. No.: 14/098,239

(22) Filed: Dec. 5, 2013

(51) Int. Cl.
   *B60D 1/00* (2006.01)
   *B60P 3/073* (2006.01)

(52) U.S. Cl.
   CPC ........................................ *B60P 3/073* (2013.01)

(58) Field of Classification Search
   CPC .......... B61D 3/188; B61D 15/00; B61D 3/18; B61D 45/001; B61D 45/008; B62B 2202/90; B62B 2301/20; B62B 3/001; B62B 3/06; B62B 5/0003; B62B 5/0026; B62B 5/0079; B62B 5/0083; B62B 5/04; B62B 5/049
   USPC ........... 410/7, 30, 23, 3, 4, 19, 12, 100, 20, 9, 410/97, 103, 121, 22; 414/921, 373, 462, 414/480, 498, 537, 541; 296/18, 20
   See application file for complete search history.

(56) References Cited

U.S. PATENT DOCUMENTS

| | | | |
|---|---|---|---|
| 4,340,240 A * | 7/1982 | Anderson | 280/461.1 |
| 4,772,040 A * | 9/1988 | Klemm | 280/490.1 |
| 7,347,653 B1 * | 3/2008 | Roberts | 410/3 |
| 2002/0105162 A1 * | 8/2002 | Green | 280/477 |
| 2009/0072516 A1 * | 3/2009 | Kuenzel | 280/477 |
| 2011/0006553 A1 * | 1/2011 | Fretz et al. | 293/115 |
| 2013/0134724 A1 * | 5/2013 | Fisher et al. | 293/142 |

* cited by examiner

*Primary Examiner* — Jason S Morrow
*Assistant Examiner* — Sunsurraye Westbrook
(74) *Attorney, Agent, or Firm* — Williams Intellectual Property; Benjamin F. Williams

(57) ABSTRACT

A spring-loaded bumper clamp for vehicular trailers attachable to a rail of an extant trailer, said spring-loaded bumper clamp including a pair of hook clamps disposed on either end of a pivot bar, said pivot bar rotatably disposed between each of a pair of vertical strut members vertically oriented atop each of a pair of horizontal strut members, which horizontal strut members are attached to a plate member connectable to the rail of an extant trailer, wherein rotation of the pivot bar by action of a handle member tensions a pair of spring members and moves each of the pair of hook clamps from a first position to a second position to releasably secure around an extant bumper of an all terrain vehicle, whereby an all terrain vehicle is expediently securable and releasable atop a trailer to which the spring-loaded bumper clamp is attached.

11 Claims, 5 Drawing Sheets

SPRING-LOADED BUMPER CLAMP FOR VEHICULAR TRAILERS

BACKGROUND OF THE INVENTION

Various types of devices for securing an all terrain vehicle to a trailer bed are known in the prior art. However, what is needed is a spring-loaded bumper clamp for vehicular trailers that is attachable to a rail of an extant trailer, said spring-loaded bumper clamp including a pair of hook clamps disposed on either end of a pivot bar, said pivot bar horizontally disposed rotatably between each of a pair of vertical strut members, each of said vertical strut members vertically oriented and positional upon each of a pair of horizontal strut members, said horizontal strut members attached to a plate member, which plate member is securely attachable to the rail of an extant trailer, wherein rotation of the pivot bar by action of a handle member there disposed tensions a pair of spring members and moves each of the pair of hook clamps from a first position to a second position to releasably secure around an extant bumper of an all terrain vehicle, said hook clamps thereat securable in the second position by insertion of a lock pin through a first aperture, disposed in at least one of the pair of hook clamps, and a second aperture, disposed in at least one of the pair of vertical strut members, which first and second aperture align when the pair of hook clamps are moved to the second position, whereby an all terrain vehicle is expediently securable and releasable atop the trailer to which the spring-loaded bumper clamp is attached.

FIELD OF THE INVENTION

The present invention relates to a spring-loaded bumper clamp for vehicular trailers, and more particularly, to a spring-loaded bumper clamp for vehicular trailers that is attachable to a rail of an extant trailer, said spring-loaded bumper clamp including a pair of hook clamps disposed on either end of a pivot bar, said pivot bar horizontally disposed rotatably between each of a pair of vertical strut members, each of said vertical strut members vertically oriented and positional atop each of a pair of horizontal strut members attached to a plate member, which plate member is securely attachable to the rail of an extant trailer, wherein rotation of the pivot bar by action of a handle member there disposed tensions a pair of spring members and moves each of the pair of hook clamps from a first position to a second position to releasably secure around an extant bumper of an all terrain vehicle, said hook clamps thereat securable in the second position by insertion of a lock pin through a first aperture, disposed in at least one of the pair of hook clamps, and a second aperture, disposed in at least one of the pair of vertical strut members, which first and second aperture align when the pair of hook clamps are moved to the second position, whereby an all terrain vehicle is expediently securable and releasable atop the trailer to which the spring-loaded bumper clamp is attached.

SUMMARY OF THE INVENTION

The general purpose of the spring-loaded bumper clamp for vehicular trailers, described subsequently in greater detail, is to provide a spring-loaded bumper clamp for vehicular trailers which has many novel features that result in a spring-loaded bumper clamp for vehicular trailers which is not anticipated, rendered obvious, suggested, or even implied by prior art, either alone or in combination thereof.

The term "all terrain vehicle" and "ATV" as used throughout the specification is taken to include class I motorized, off-highway, recreational vehicles; class II motorized vehicles capable of cross-country travel; class III motorized, off-highway, recreational vehicles; four-wheeled motorcycles; other all terrain vehicles; golf carts; and other such vehicles that have a front bumper and are readily transportable upon a trailer or may otherwise be suited for use with the present invention herein disclosed.

The present invention enables expedient secure and release of an all terrain vehicle ("ATV") atop a trailer bed for ready transport thereon. The present device expediently engages with a front bumper of an ATV, when said ATV is appropriately parked a given distance from the device, and a pair of hook clamps are moveable from a first position to a second position to releasably engage with the ATV bumper and secure said ATV in a desired position atop a trailer.

The present spring-loaded bumper clamp for vehicular trailers, therefore, includes a plate member securable to a rail, or other suitable surface, of an extant trailer. A pair of horizontal strut members is disposed spaced apart in parallel relation upon a top surface of the plate member, and disposed to extend over a long edge of the plate member. Each of a pair of vertical strut members is adjustably interconnectable with each of the pair of horizontal strut members by positional connection of each of a pair of adjustable strut members therebetween. Each of the pair of adjustable strut members securably positions each of the pair of vertical strut members along the length of the pair of horizontal strut members and enables vertical situation of the vertical strut members therebetween.

A pivot bar is rotatably disposed between each of the pair of vertical strut members. Each of a pair of hook clamps is disposed endwise upon the pivot bar, said hook clamps thereat moveable between a first position and a second position by rotation of the pivot bar. A handle member, disposed perpendicularly upon the pivot bar, is disposed to enable ready rotation of the pivot bar and thus move the pair of hook clamps from the first position to the second position.

Each of a pair of spring members is disposed in tension between each of the pair of hook members and each of the pair of vertical strut members. Each of the pair of spring members is disposed on each of a pair of spring supports. The pair of hook clamps are thus tensioned against the action of the pair of spring members and maintained in the first position by abutment against each of a pair of stop members disposed to contain the pair of hook clamps in the first position, respectively raised thereat, relative the second position wherein each of the pair of hook clamps are lowered into a relatively horizontal position.

Movement of the handle member therefore rotates the pivot bar and moves the pair of hook clamps between the first position and the second position. Movement of the pair of hook clamps to the second position tensions the pair of spring members. When each of the pair of hook clamps are moved to the second position, each of a pair of arced cutouts, disposed on an lower edge of each of the pair of hook clamps, is engaged with the bumper of an extant ATV parked an appropriate distance relative the device.

To secure the pair of hook clamps engaged around the bumper of said extant ATV when said hook clamps are moved to the second position, a lock pin is releasably insertable through each of a first and second aperture, disposed upon at least one of the pair of hook clamps and at least one of the pair of vertical strut members respectively. The first aperture is configured for alignment with the second aperture when the pair of hook clamps is moved to the second position whereby insertion of the lock pin prevents action of the spring members to return the pair of hook clamps to the first position. A clip member, releasably insertable through a hole in the lock pin, prevents withdrawal of the lock pin from engagement through each of the first and second apertures until said clip member is released from the lock pin.

Thus, a user is enabled to park an extant ATV upon a trailer bed, parked an appropriate distance relative the present spring-loaded bumper clamp for vehicular trailers, and said ATV is there expediently securable to the trailer by engagement with each of the pair of hook clamps for transport, as desired. Quick release of the ATV for deployment from the trailer bed is effected when the lock pin is removed, enabling the pair of hook clamps to release from engagement with the ATV bumper, and return to the first position, whereby a user may readily reverse the ATV from the trailer bed for use, as desired.

Thus has been broadly outlined the more important features of the present spring-loaded bumper clamp for vehicular trailers so that the detailed description thereof that follows may be better understood and in order that the present contribution to the art may be better appreciated.

Objects of the present spring-loaded bumper clamp for vehicular trailers, along with various novel features that characterize the invention are particularly pointed out in the claims forming a part of this disclosure. For better understanding of the spring-loaded bumper clamp for vehicular trailers, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
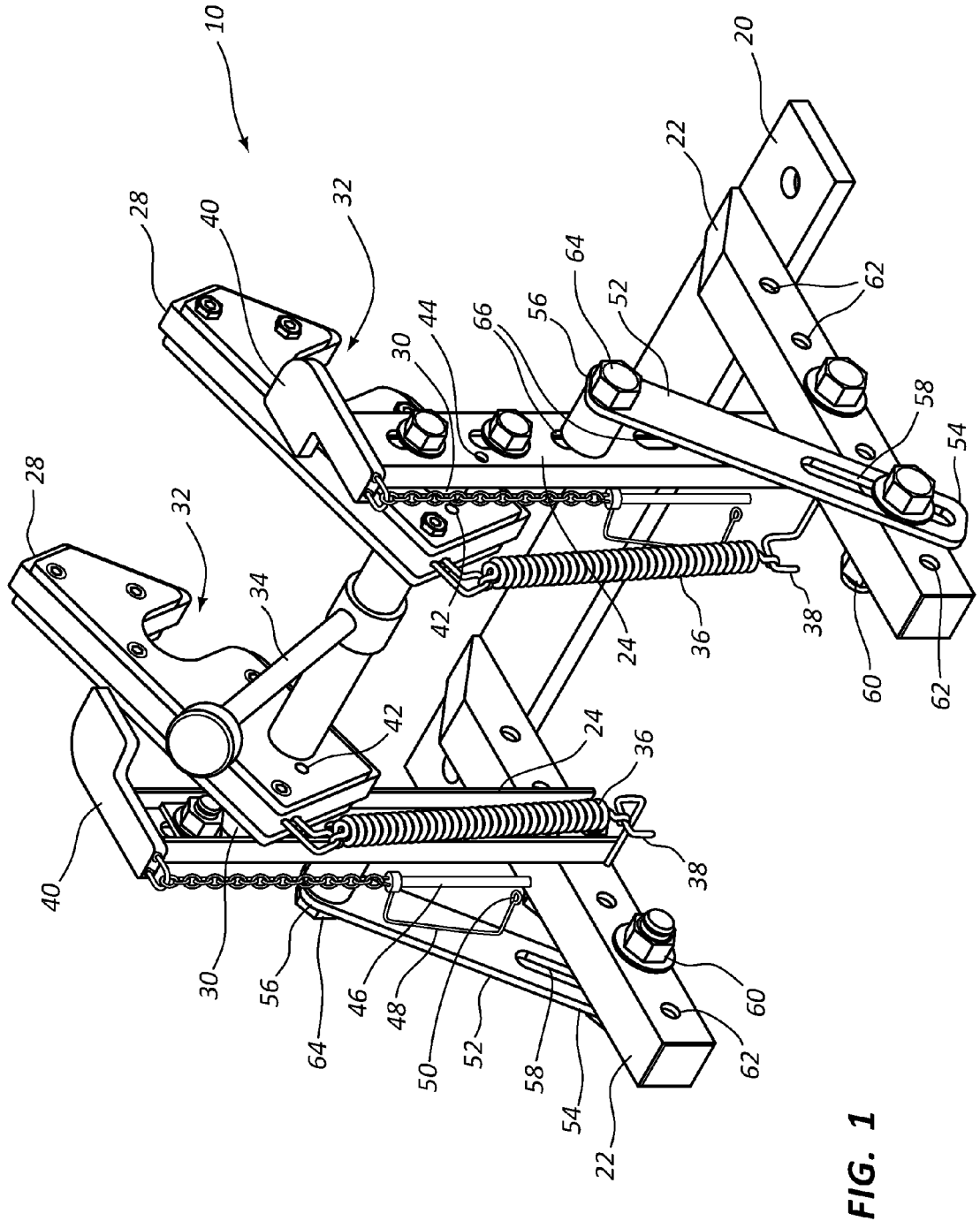
FIG. 1 is a rear isometric view.
Figure 2:
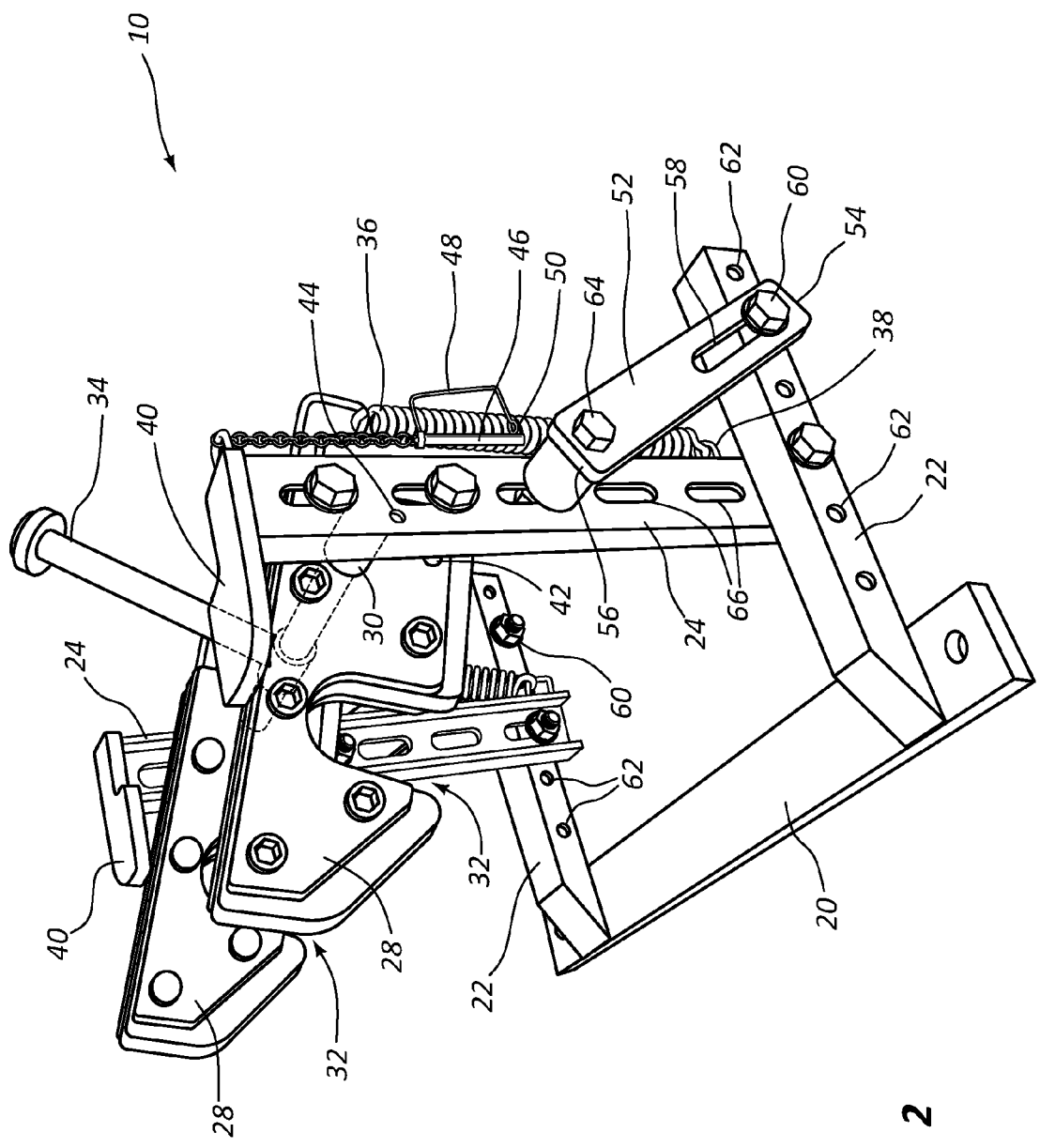
FIG. 2 is a front isometric view.
Figure 3:
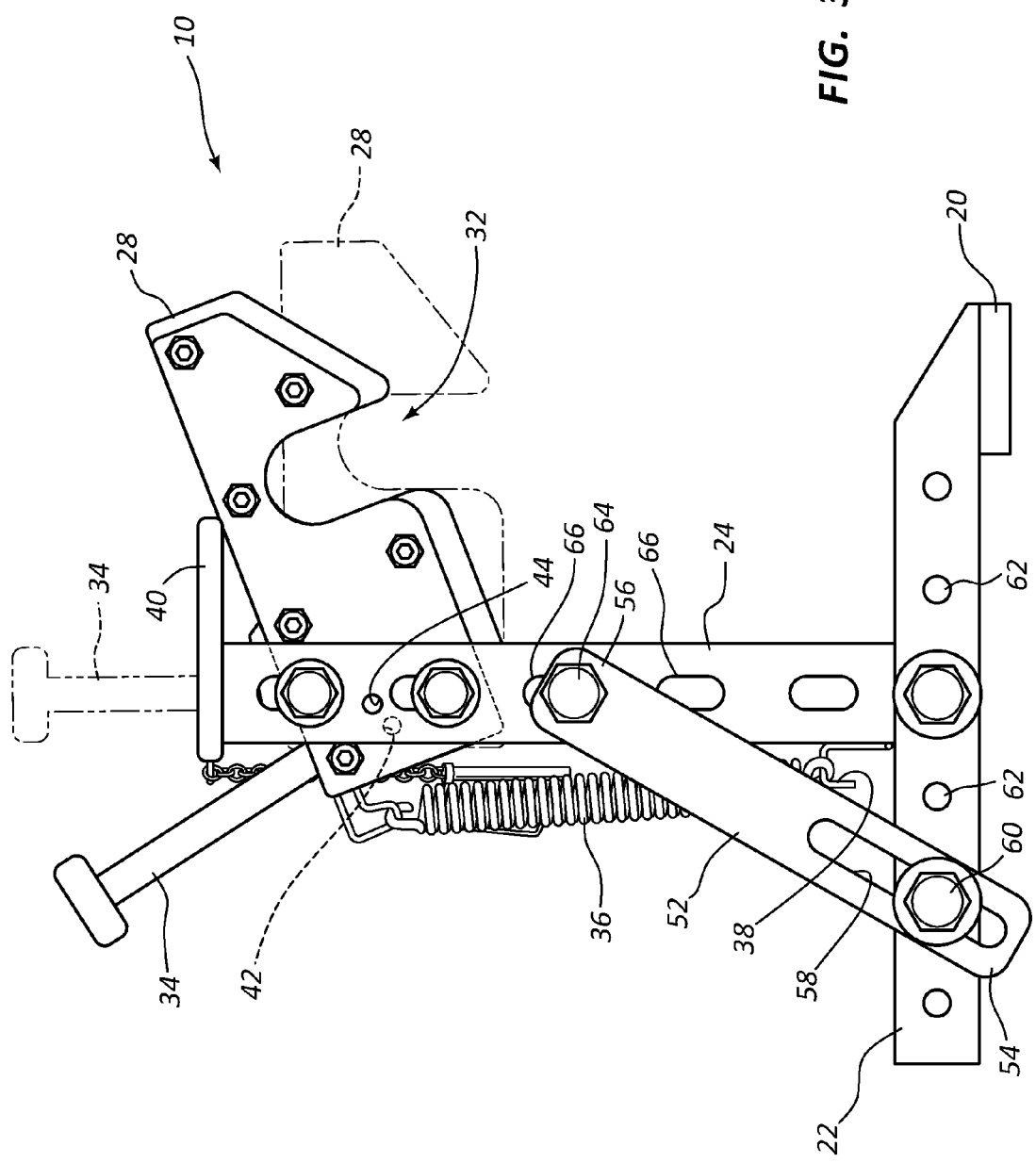
FIG. 3 is a side view.
Figure 4:
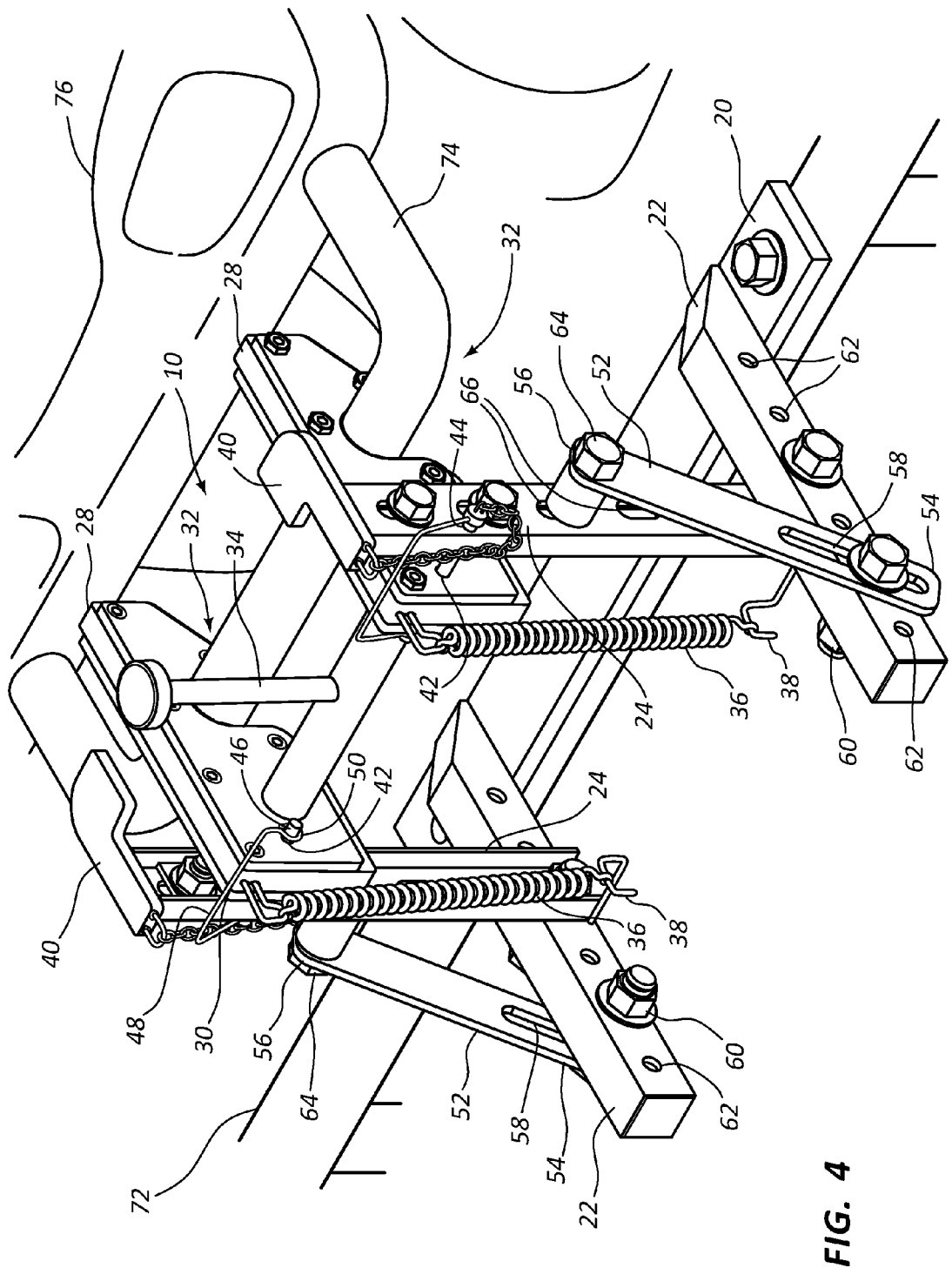
FIG. 4 is an isometric in-use view illustrating engagement of a pair of hook clamps with a bumper of an extant all terrain vehicle.
Figure 5:
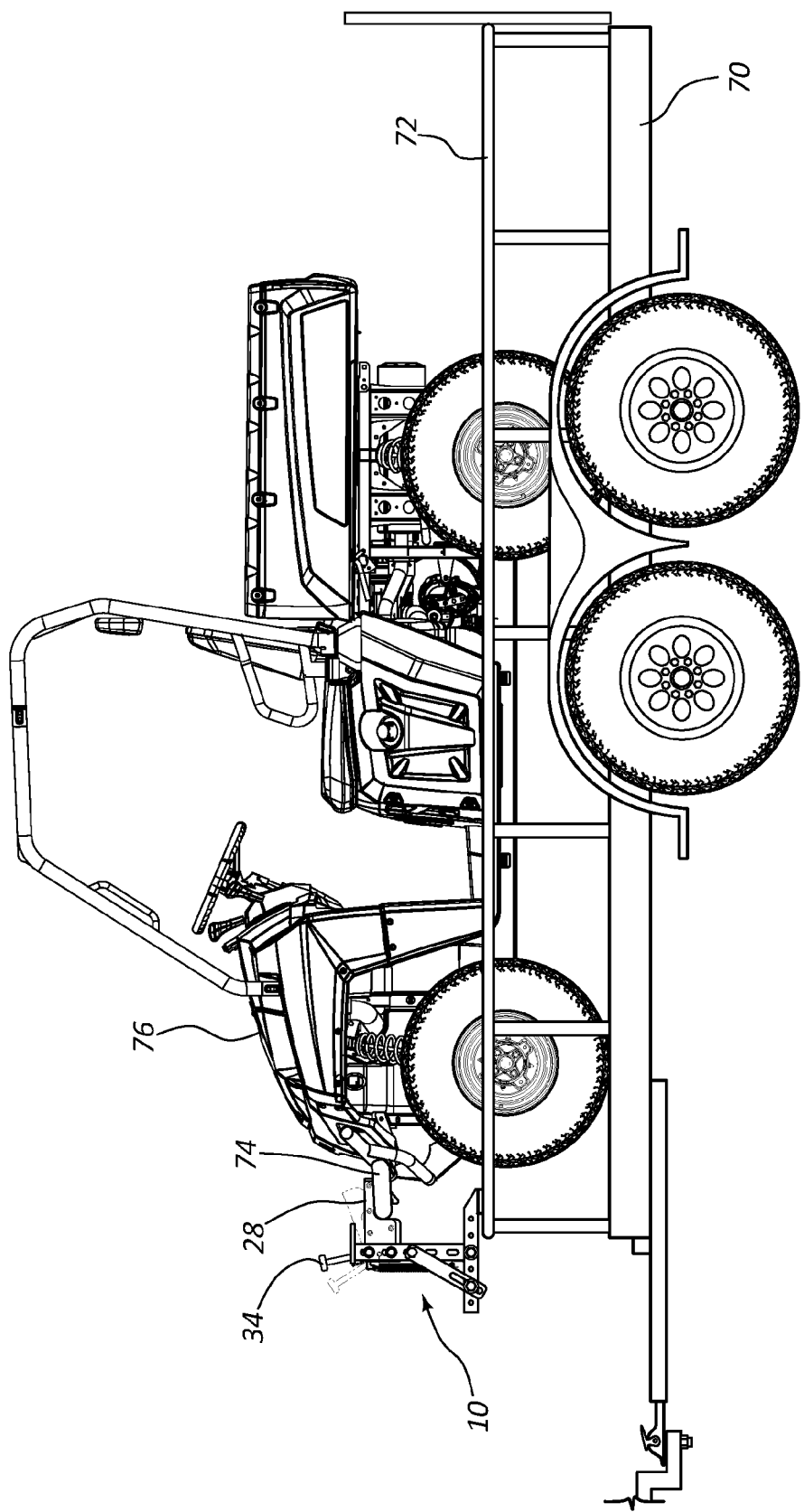
FIG. 5 is an in-use view.

With reference now to the drawings, and in particular FIGS. 1 through 4 thereof, example of the instant spring-loaded bumper clamp for vehicular trailers employing the principles and concepts of the present spring-loaded bumper clamp for vehicular trailers and generally designated by the reference number 10 will be described.

Referring to FIGS. 1 through 4 a preferred embodiment of the present spring-loaded bumper clamp for vehicular trailers 10 is illustrated.

The present spring-loaded bumper clamp for vehicular trailers 10 has been devised to enable an expedient means of securing an all terrain vehicle ("ATV") 76 to a trailer 70 bed. The present spring-loaded bumper clamp for vehicular trailers 10 releasably engages with the bumper 74 disposed on an extant ATV 76 and releasably secures the ATV 76 atop the trailer 70 bed. A user may simply drive the ATV 76 onto the trailer 70 bed, park within an appropriate distance from the spring-loaded bumper clamp for vehicular trailers 10, and releasably engage each of a pair of hook clamps 28 to the ATV bumper 74. Expedient release of the ATV 76 for use is effected by disengaging the pair of hook clamps 28, as will be described subsequently.

The present spring-loaded bumper clamp for vehicular trailers 10, therefore, includes a plate member 20 disposed for attachment to an extant trailer rail 72. The plate member 20 is securable in a horizontal disposition atop an extant trailer rail 72, preferably at the front end of the trailer 70. A pair of horizontal strut members 22 is attached to the plate member 20, each of said pair of horizontal strut members 22 spaced apart and disposed in parallel to extend over a long edge of the plate member 20.

Each of a pair of vertical strut members 24 is disposed upon each of the pair of horizontal strut members 22. Each of the pair of vertical strut members 24 is connected to each of the pair of horizontal strut members 22 by each of a pair of adjustable strut members 52 that accommodate adjustment of the height and position of each of the pair of vertical strut members 24 relative each of the pair of horizontal strut members 22. Each of said pair of adjustable strut members 52 enables positioning and repositioning of the pair of vertical strut members 24 in a desired situation along the length of the pair of horizontal strut members 22 to accommodate engagement with the bumper of different models of ATVs.

In the preferred embodiment herein disclosed, each of the pair of adjustable strut members 52 is releasably attachable to each vertical strut member 24 and an associated one of the pair of horizontal strut members 22. Each of the pair of adjustable strut members 52 includes a first end 54 and a second end 56. An elongate aperture 58 is disposed in each adjustable strut member 52 proximal the first end 54, said elongate aperture 58 disposed along a longitudinal medial axis of said adjustable strut member 52 for positional engagement of a first fastener 60 therethrough, said first fastener 60 disposed to releasably interconnect said adjustable strut member 52 with one of a plurality of apertures 62 disposed serried along a longitudinal axis of each of the pair of horizontal strut members 22. A second fastener 64 is disposed at the second end 56 of each adjustable strut member 52 for releasable attachment to one of a series of elongate apertures 66 disposed serried in each vertical strut member 52.

The pair of vertical strut members 24 is thereby securably positional at discrete increments along the length of the horizontal strut members 22, interconnected at one of the plurality of apertures 62, and also vertically situational between the pair of horizontal strut members 22, interconnected at one of the plurality of elongate apertures 66, to accommodate engagement of the pair of hook clamps 28 with bumpers of various models of ATVs, as will be described subsequently.

A pivot bar 26 is rotatably disposed through each of the pair of vertical strut members 24 and each of a pair of hook clamps 28 is disposed endwise upon the pivot bar 26. A pair of pivot bar support blocks 30 is disposed at either end of the pivot bar 30 and mounted to each vertical strut member 24. Each of the pair of hook clamps 28 includes an arced cutout 32 disposed on an underside thereof, said arced cutout 32 configured to hook over an extant bumper 74 of an all terrain vehicle ("ATV") 76 when the pair of hook clamps 28 is moved from a first position to a second position.

A handle member 34 is disposed perpendicularly upon the pivot bar 26 between each of the pair of hook clamps 28, said handle member 34 enabling rotation of the pivot bar 26 and movement of the pair of hook clamps 28 between the first position, with the pair of hook clamps 28 disposed in a relatively raised situation, and the second position, with the pair of hook clamps 28 disposed in a relatively horizontal situation.

Each of a pair of spring members 36 is disposed connecting each of the pair of hook clamps 28 to each of the pair of spring supports 38 disposed upon each of the pair of horizontal strut members 22, said spring members 36 thereat engaging each of the pair of hook clamps 28 in the first position, whereby each of the pair of hook clamps 28 are raised from the second position by action of the spring members 36. Each of a pair of stop members 40 is disposed upon each of the pair of pivot bar support blocks 30 and situated to abut against each of the pair of hook clamps 28, each of said pair of stop members 40 thereby maintaining each of the pair of hook claims 28 in the first position against the action of the pair of spring members 36.

Raising the handle member 34, therefore, further tensions the pair of spring members 36 when the pair of hook clamps 28 are lowered into the first position for engagement of the arced cutouts 32 around an extant ATV bumper 74.

To releasably secure the pair of hook clamps 28 in the first position when engaged around an ATV bumper 74, a first aperture 42 is disposed in at least one of the pair of hook clamps 28, said first aperture 42 disposed to align with a second aperture 44 disposed in at least one of the pair of vertical strut members 24 when the pair of hook clamps 28 is moved to a second position. A lock pin 46 is securable through each of the first and second apertures 42, 44 when the pair of hook clamps 28 are moved to the second position, said lock pin 46 securable therethrough when a clip member 48 is perpendicularly attached to the lock pin 46 through a hole 50 disposed in the lock pin 46. The lock pin 46 thus remains inserted through each of the first and second apertures 42, 44 until the clip member 48 is removed enabling withdrawal of the lock pin 46 from the apertures 42, 44 whereby the pair of spring members 36 assist movement of the pair of hook clamps 28 to the first position to release the ATV 76 previously secured by the device 10 to a trailer 70 bed.

Thus, raising the handle member 34 rotates the pivot bar 26 to move the pair of hook clamps 28 from the first position to the second position against the action of the spring members 36, and the pair of hook clamps 28 is thereby positional to engage around a front bumper 74 of an extant ATV 76 loaded to the trailer 70. The pair of hook clamps 28 is expediently securable in the second position when the lock pin 46 is secured through each of the first and second apertures 42, 44, and the ATV 76 is thereby readily securable atop the trailer 70 to which the spring-loaded bumper clamp for vehicular trailers 10 is fitted. The ATV 76 is likewise expediently releasable for rapid deployment for the trailer 70, when desired.

What is claimed is:

1. A spring-loaded bumper clamp for vehicular trailers attachable to a rail of an extant trailer, said spring-loaded bumper clamp comprising a pair of hook clamps disposed on either end of a pivot bar, said pivot bar horizontally disposed rotatably between each of a pair of vertical strut members, each of said vertical strut members vertically oriented upon each of a pair of horizontal strut members, said horizontal strut members attached endwise to a plate member, which plate member is securely attachable to the rail of an extant trailer, wherein rotation of the pivot bar by action of a handle member there disposed tensions a pair of spring members and moves each of the pair of hook clamps from a first position to a second position to releasably secure around an extant bumper of an all terrain vehicle, said hook clamps thereat securable in the second position by insertion of a lock pin through a first aperture, disposed in at least one of the pair of hook clamps, and a second aperture, disposed in at least one of the pair of vertical strut members, which first and second aperture align when the pair of hook clamps is moved to the second position, whereby said all terrain vehicle is expediently securable and releasable atop the trailer to which the spring-loaded bumper clamp is attached.

2. The spring-loaded bumper clamp for vehicular trailers of claim 1 wherein each of the pair of vertical strut members is adjustably mounted atop each of the pair of horizontal strut members whereby each of the pair of vertical strut members is securable along the length of each of the pair of horizontal strut members, and vertically situational therebetween, to securably reposition the pair of hook clamps appropriate to engagement with an extant bumper of an alternate all terrain vehicle.

3. The spring-loaded bumper clamp for vehicular trailers of claim 2 further comprising each of a pair of stop members attached to each of the pair of vertical strut members, each of said pair of stop members disposed to abut each of the pair of hook clamps and maintain said hook clamps in the first position.

4. The spring-loaded bumper clamp for vehicular trailers of claim 3 wherein the lock pin further comprises a hole disposed in an end thereof, through which hole a clip member is attachable to prevent retraction of the pin through each of the first and second apertures until the clip member is released therefrom.

5. The spring-loaded bumper clamp for vehicular trailers of claim 4 wherein each of the pair of spring members is attached endwise to each of the pair of hook clamps and each of the pair of vertical strut members, whereby rotation of the pivot bar to move the pair of hook clamps to the second position tensions said pair of spring members.

6. The spring-loaded bumper clamp for vehicular trailers of claim 5 wherein each of the pair of hook clamps comprises an arced cutout disposed to hook over an extant bumper of an all terrain vehicle.

7. The spring-loaded bumper clamp for vehicular trailers of claim 6 wherein each of the pair of spring members attaches to each of the vertical strut members at each of a pair of spring supports.

8. The spring-loaded bumper clamp for vehicular trailers of claim 7 wherein the lock pin is attached to one of the pair of spring supports for convenient access when moving the pair of hook clamps from the first position to the second position.

9. A spring-loaded bumper clamp for vehicular trailers comprising:
a plate member disposed for attachment to an extant trailer rail;
is a pair of horizontal strut members attached to the plate member, each of said pair of horizontal strut members extending over a long edge of the plate member;
each of a pair of vertical strut members adjustably disposed and positional upon each of the pair of horizontal strut members;
a pivot bar rotatably disposed through each of the pair of vertical strut members;
each of a pair of hook clamps disposed endwise upon the pivot bar;
a handle member disposed perpendicularly upon the pivot bar between each of the pair of hook clamps;
each of a pair of spring members disposed connecting each of the pair of hook clamps to each of the pair of vertical strut members, said spring members engaging each of the pair of hook clamps in first position;
each of a pair of stop members disposed to abut against each of the pair of hook clamps, each of said pair of stop members maintaining each of the pair of hook claims in the first position against the action of the pair of spring members;
a first aperture disposed in at least one of the pair of hook clamps, said first aperture disposed to align with a second aperture disposed in at least one of the pair of vertical strut members when the pair of hook clamps are moved to a second position; and a lock pin securable through each of the first and second apertures when the pair of hook clamps are moved to the second position;

wherein raising the handle member rotates the pivot bar to move the pair of hook clamps from the first position to the second position against the action of the spring members, the pair of hook clamps thereby positional to engage around a front bumper of an extant all terrain vehicle loaded to the trailer, whereby the pair of hook clamps is securable in the second position when the lock pin is secured through each of the first and second apertures, and the all terrain vehicle is thereby securable and expediently releasable atop the trailer to which the spring-loaded bumper clamp for vehicular trailers is fitted.

10. The spring-loaded bumper clamp for vehicular trailers of claim 9 wherein each of the pair of vertical strut members is adjustably mounted upon each of the pair of horizontal strut members by interconnection with each of a pair of adjustable strut members, each of said adjustable strut member comprising:

a first end and a second end;

an elongate aperture disposed along a longitudinal medial axis of said adjustable strut member;

a first fastener releasably securable and positional through the elongate aperture into one of a plurality of apertures disposed serried along a longitudinal axis of an associated horizontal strut member; and a second fastener disposed at the second end, said second fastener releasably securable into one of a plurality of elongate apertures disposed serried along a longitudinal axis of an associated vertical strut member;

whereby each of the pair of vertical strut members is securable along the length of each of the pair of horizontal strut members, and vertically situational therebetween, to securably reposition the pair of hook clamps appropriate for engagement with an extant bumper of an alternate all terrain vehicle.

11. A spring-loaded bumper clamp for vehicular trailers comprising:

a plate member disposed for attachment to an extant trailer rail;

a pair of horizontal strut members attached to the plate member, each of said pair of horizontal strut members extending over a long edge of the plate member;

each of a pair of vertical strut members adjustably interconnectable with each of the pair of horizontal strut members;

each of a pair of adjustable strut members disposed to adjustably interconnect the pair of vertical strut members to the pair of horizontal strut members, each of said pair of adjustable strut members comprising:

a first end and a second end;

an elongate aperture disposed along a longitudinal medial axis of said adjustable strut member;

a first fastener releasably securable and positional through the elongate aperture into one of a plurality of apertures disposed serried along a longitudinal axis of an associated horizontal strut member;

a second fastener disposed at the second end, said second fastener releasably securable into one of a plurality of elongate apertures disposed serried along a longitudinal axis of an associated vertical strut member;

a pivot bar rotatably disposed through each of the pair of vertical strut members;

each of a pair of hook clamps disposed endwise upon the pivot bar;

a handle member disposed perpendicularly upon the pivot bar between each of the pair of hook clamps;

each of a pair of spring members disposed connecting each of the pair of hook clamps to each of the pair of vertical strut members, said spring members engaging each of the pair of hook clamps in first position;

each of a pair of stop members disposed to abut against each of the pair of hook clamps, each of said pair of stop members maintaining each of the pair of hook claims in the first position against the action of the pair of spring members;

a first aperture disposed in at least one of the pair of hook clamps, said first aperture disposed to align with a second aperture disposed in at least one of the pair of vertical strut members when the pair of hook clamps are moved to a second position; and a lock pin securable through each of the first and second apertures when the pair of hook clamps are moved to the second position;

wherein the pair of hook clamps are adjustably positional for engagement with a bumper of an extant all terrain vehicle and raising the handle member rotates the pivot bar to move the pair of hook clamps from the first position to the second position against the action of the spring members, the pair of hook clamps thereby positional to engage around a front bumper of an extant all terrain vehicle loaded to the trailer, whereby the pair of hook clamps is securable in the second position when the lock pin is secured through each of the first and second apertures, and the all terrain vehicle is thereby securable atop the trailer to which the spring-loaded bumper clamp for vehicular trailers is fitted.

* * * * *